United States Patent [19]
Fujiwara et al.

[11] Patent Number: 4,807,227
[45] Date of Patent: Feb. 21, 1989

[54] OPTICAL WAVELENGTH-DIVISION SWITCHING SYSTEM WITH COHERENT OPTICAL DETECTION SYSTEM

[75] Inventors: Masahiko Fujiwara; Minoru Shikada; Kazuhisa Kaede, all of Tokyo, Japan

[73] Assignee: NEC Corporation, Tokyo, Japan

[21] Appl. No.: 108,679

[22] Filed: Oct. 15, 1987

[30] Foreign Application Priority Data

Oct. 15, 1986 [JP] Japan ................................ 61-245842

[51] Int. Cl.$^4$ ............................................. H04B 9/00
[52] U.S. Cl. ......................................... 370/3; 370/1; 455/600
[58] Field of Search ............... 455/600, 601, 603, 606, 455/607, 617, 618, 619, 612, 613, 609, 610; 370/3, 1

[56] References Cited

U.S. PATENT DOCUMENTS

| | | | |
|---|---|---|---|
| 3,851,167 | 11/1974 | Levine | 455/617 |
| 4,601,027 | 7/1986 | Scarret et al. | 370/3 |
| 4,608,682 | 8/1986 | Nagashima | 370/4 |

FOREIGN PATENT DOCUMENTS

| | | | |
|---|---|---|---|
| 0112652 | 2/1978 | Japan | 455/601 |
| 60-172841 | 6/1985 | Japan | |
| 0254991 | 12/1985 | Japan | 370/4 |

OTHER PUBLICATIONS

Payne et al., "Transparent Single-Mode Fiber Optical Networks", Journal of Lightwave Tech., vol. LT-4, No. 7, Jul. 1986, pp. 864–869.

"Novel Optical FSK Heterodyne Single Filter Detection System Using a Directly Modulated DFB-Laser Diode", Electronics Letters, Nov. 22nd, vol. 20, No. 24, pp. 1022–1023, Emura et al.

T. Okoshi, "Recent Advances in Coherent Optical Fibre Communication Systems", IOOC-ECOC '85, pp. 73–80.

Alferness et al., "Tunable Optical Waveguide Directional Coupler Filter", Appl. Phys. Lett., 33(2), Jul. 15, 1978, pp. 161–163.

Tohmori et al., "Letter: Wavelength Tunable 1.5 um GaInAsP/InP Bundle-Integrated Guide Distributed Bragg Reflector (BIG-DBR) Lasers", The Transactions of the IECE of Japan, vol. E-68, No. 12, Dec. 1985, pp. 788–790.

"Wide Range Wavelength Tuning in 1.3 um DBR-DC-PBH-LDs by Current Injection into the DBR Region," Electronics Letters, Jan. 17th, 1985, vol. 21, No. 2, pp. 63–65.

*Primary Examiner*—Robert L. Griffin
*Assistant Examiner*—Leslie Van Beek
*Attorney, Agent, or Firm*—Sughrue, Mion, Zinn, Macpeak, and Seas

[57] ABSTRACT

An optical wavelength-division switching system comprises means for reproducing an electric signal for each channel from a wavelength division multiplexed optical signal, and means for converting the electric signal to a modulated optical signal. The means for reproducing the electric signal can be composed of an optical heterodyne or homodyne detection system, while the means for converting the electric signal can be composed of a distributed feedback laser diode having an optical frequency modulating characteristic so that the number of channels is much increased with the decrease of crosstalk.

2 Claims, 3 Drawing Sheets

IF FREQUENCY (MHz)

OPTICAL WAVELENGTH-DIVISION SWITCHING SYSTEM WITH COHERENT OPTICAL DETECTION SYSTEM

FIELD OF THE INVENTION

The invention relates to an optical wavelength-division switching system, and more particularly to an optical wavelength-division switching system in which a plurality of optical signals are switched among a plurality of channels.

BACKGROUND OF THE INVENTION

One conventional optical wavelength-division switching system is described in Japanese patent laid open No. 60-172841 (172841/1985) the laid open date of which is Sept. 6, 1985. The optical wavelength-division switching system comprises an optical variable wavelength filter for demultiplexing a wavelength division multiplexed (WDM) optical signal into a plurality of optical signals each having a wavelength different from others, means for converting the wavelengths of the demultiplexed optical signals in accordance with the specified switching condition, and an optical combiner for combining the optical signals each being of a wavelength different from others.

In operation, the WDM optical signal is supplied from an optical fiber to the optical variable wavelength filter to be demultiplexed into a plurality of the optical signals so that each of the optical signals has a wavelength different from others. The optical signals thus demultiplexed are converted in regard to their wavelengths in the wavelength converting means. For instance, if a wavelength of an optical signal is converted from $\lambda_1$ to $\lambda_2$, and that of another optical signal is converted from $\lambda_2$ to $\lambda_1$, the optical signals of the wavelengths $\lambda_1$ and $\lambda_2$ are switched therein. The optical signals thus converted in regard to their wavelengths are combined in the optical combiner to be supplied to another optical fiber. The optical variable wavelength filter may be, for instance, of a directional coupler type utilizing an electrical-optical effect as described on pages 161 to 163 of "Applied Physics Letters", vol. 33 (2), 1978, or on page 131 of "Applied Physics Letters", vol. 39 (2), 1981, of a mode conversion type as described on page 861 of "Applied Physics Letters", vol. 40 (10), 1982, or of such a means as utilizing an acoustic-optical effect.

Much attention is paid to such an optical wavelength-division switching system as described above because a scale of line capacity can be expanded for the reason that a characteristic of light is effectively utilized therein as compared to a space-division switching system or time-division switching system.

In the optical wavelength-division switching system, however, the number of wavelength channels is limited to some extent insofar as such a variable wavelength filter as described above is adopted therein.

Further, a characteristic of crosstalk is prevented from being improved for the same reason.

In a practical use, the optical wavelength-division switching system can not be applied to an optical communication system including wavelength channels of several tens to one hundred.

SUMMARY OF THE INVENTION

Accordingly, it is an object of the invention to provide an optical wavelength-division switching system in which the number of wavelength channels can be increased to such an extent as expected.

It is a further object of the invention to provide an optical wavelength-division switching system in which a characteristic of crosstalk is much improved.

According to the invention, an optical wavelength-division switching system comprises, means for dividing a WDM optical signal into a predetermined number of WDM optical signals, said predetermined number corresponding to the number of channels of an optical communication system, means for reproducing a predetermined number of electric signals from said predetermined number of WDM optical signals, said electric signals being separated from each other to correspond to said channels, means for converting said predetermined number of electric signals to a predetermined number of optical signals, said predetermined number of optical signals being controlled to have individual frequencies in accordance with a specified switching condition of said optical communication system, and means for combining said predetermined number of optical signals to provide a WDM optical signal, wherein said means for reproducing is composed of a predetermined number of electric signal detectors, each of said electric signal detectors including a light source for producing a predetermined frequency of a local oscillation light, an optical combiner for combining one of said predetermined number of wavelength division multiplexed signals with said local oscillation light to produce an intermediate frequency of an optical signal, an optical-electrical converter for converting said intermediate frequency of an optical signal to said intermediate frequency of an electric signal, and a demodulator for demodulating said intermediate frequency of an electric signal to produce one of a predetermined number of electric signals.

BRIEF DESCRIPTION OF THE DRAWINGS

The invention will be explained in detail in accordance with the following drawings wherein.

DESCRIPTION OF THE PREFERRED EMBODIMENT

Before describing an optical wavelength-division switching system according to the invention, a conventional optical wavelength-division switching system which is common in its principle to the aforementioned conventional optical wavelength-division switching system will be explained in detail.

Figure 1A:
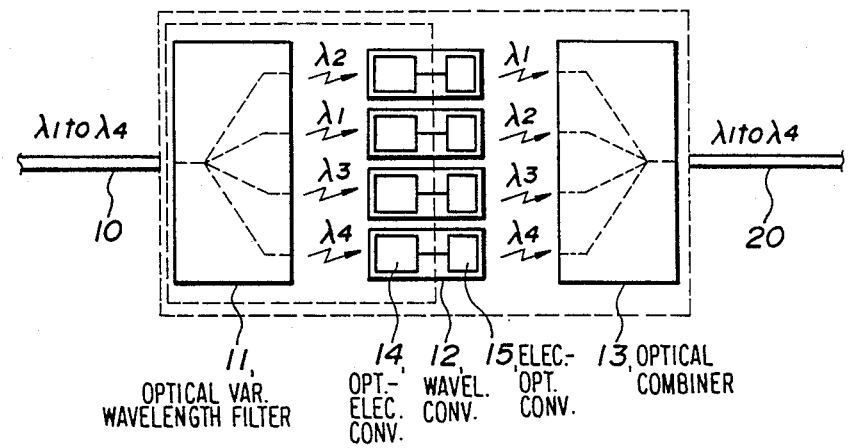
FIG. 1A is an explanatory view showing a conventional optical wavelength-division switching system.
Figure 1B:
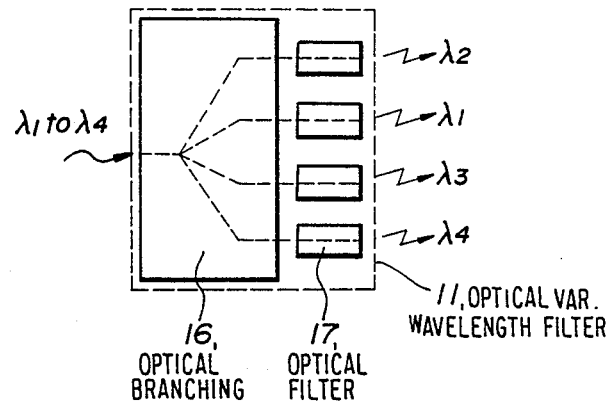
FIG. 1B is an explanatory view showing an optical variable wavelength filter in the conventional optical wavelength-division switching system.

FIG. 1A shows the conventional optical wavelength-division switching system which comprises input and output single-mode optical fibers 10 and 20, an optical variable wavelength filter 11, means 12 for converting the wavelengths of optical signals in accordance with the specified switching condition, and an optical combiner 13. Each of the wavelength converting means 12 includes an optical-electrical converter 14 and an electrical-optical converter 15.

FIG. 2A shows the optical variable wavelength filter 11 including an optical branching means 16 and optical filters 17 each having a passing-through wavelength band different from others.

In operation, a WDM optical signal of four wavelengths $\lambda_1$, $\lambda_2$, $\lambda_3$ and $\lambda_4$ is supplied from the input single-mode optical fiber 10 to the optical branching means 16 to be divided into four optical signals. Each of the four optical signals still includes the four wavelengths $\lambda_1$ to $\lambda_4$. An optical signal of the wavelength $\lambda_2$ is passed through the first optical filter 17, and optical signals of the wavelengths $\lambda_1$, $\lambda_3$ and $\lambda_4$ are respectively passed through the second to fourth optical filters 17 depending on predetermined passing-through bands thereof. The first to fourth optical signals having the individual wavelengths $\lambda_2$, $\lambda_1$, $\lambda_3$ and $\lambda_4$ are respectively converted to the first to fourth electric signals having the individual wavelengths $\lambda_1$, $\lambda_2$, $\lambda_3$ and $\lambda_4$ by the corresponding optical-electrical converters 14. Then, the first to fourth electric signals are respectively converted to the first to fourth optical signals by the corresponding electrical-optical converters 15. As a result, the optical signals of the wavelengths $\lambda_1$ and $\lambda_2$ are switched one for the other, while the optical signals of the wavelengths $\lambda_3$ and $\lambda_4$ remain unswitched. Thereafter, the first to fourth optical signals are combined in the optical combiner 13 to produce a WDM optical signal which is switched between the optical signals of the wavelengths $\lambda_1$ and $\lambda_2$. The WDM optical signal thus combined is supplied to the output single-mode fiber 20.

In the conventional optical wavelength-division switching system, however, such disadvantages as described before are resulted.

Figure 2:
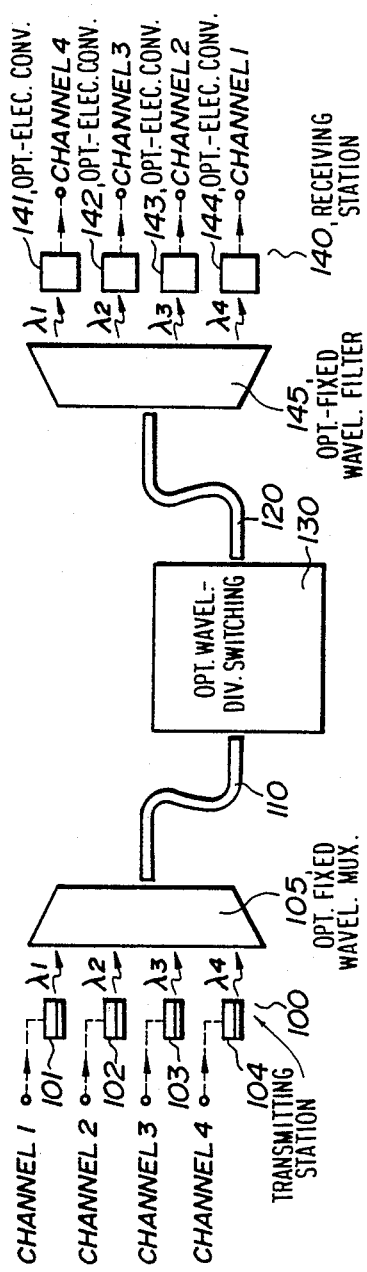
FIG. 2 is an explanatory view showing an optical communication system to which an optical wavelength-division switching system according to the invention is applied.

Next, there is shown an optical communication system in FIG. 2 to which an optical wavelength-division switching system according to the invention is applied. The optical communication system comprises a transmitting station 100, single-mode optical fibers 110 and 120, an optical wavelength-division switching system 130, and a receiving station 140. The transmitting station 100 includes the first to fourth laser diodes 101 to 104 from which the first to fourth optical signals of wavelength $\lambda_1$, $\lambda_2$, $\lambda_3$ and $\lambda_4$ are radiated, and an optical fixed wavelength multiplexer 105 for combining the first to fourth optical signals. The first to fourth optical signals have been modulated by transmitting signals of channels 1 to 4. The receiving station 140 includes an optical fixed wavelength filter 145, and the first to fourth optical-electrical converters 141 to 144.

In operation, the optical signals of the wavelengths $\lambda_1$ to $\lambda_4$ are combined in the optical fixed wavelength multiplexer 105 to produce a WDM optical signal which is then propagated through the single-mode optical fiber 110. In the optical wavelength-division switching system 130, the WOM optical signal is demultiplexed into four light signals of wavelengths $\lambda_1$ to $\lambda_4$. The optical signal of the wavelength $\lambda_1$ is converted to the optical signal of the wavelength $\lambda_4$ therein. At the same time, the optical signals of the wavelengths $\lambda_2$, $\lambda_3$ and $\lambda_4$ are converted to the optical signals of $\lambda_3$, $\lambda_2$ and $\lambda_1$ therein, respectively. The optical signals of the wavelengths $\lambda_4$ to $\lambda_1$ thus converted are combined therein to produce a WDM optical signal which is then propagated through the single-mode optical fiber 120. The WDM optical signal is demultiplexed in the optical fixed wavelength filter 145 into four optical signals of the wavelengths $\lambda_1$ to $\lambda_4$. The light signal of the wavelength $\lambda_1$ is converted in the first optical-electrical converter 141 to the first electric signal which is then supplied to the channel 4. At the same time, the optical signals of the wavelengths $\lambda_2$ to $\lambda_4$ are respectively converted in the second to fourth optical-electrical converters 142 to 144 to the second to fourth electric signals which are then supplied to the channels 3 to 1. In this manner, the transmitting signals of the channels 1 to 4 in the transmitting station 100 are switched to the receiving signals of the channels 4 to 1 by means of the optical wavelength-division switching system 130.

Figure 3:
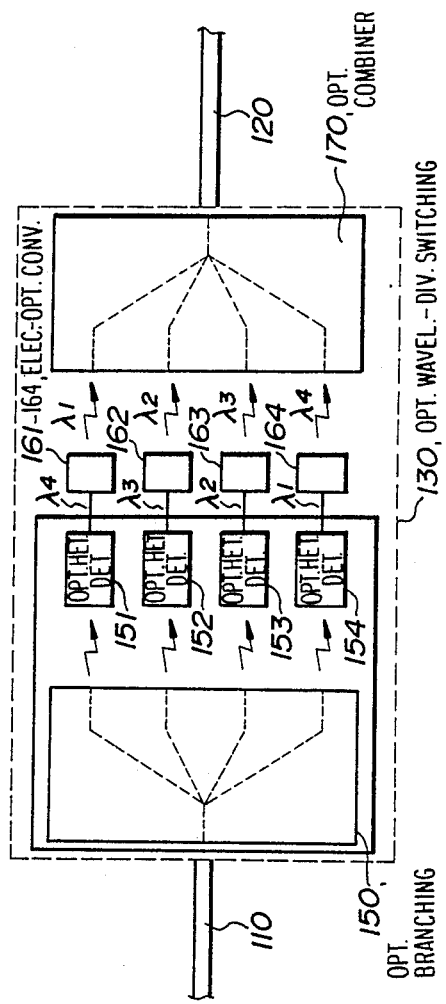
FIG. 3 is an explanatory view showing an optical wavelength-division switching system in an embodiment according to the invention.

FIG. 3 shows the optical wavelength-division switching system 130 which is applied to the optical communication system shown in FIG. 2. The optical wavelength-division switching system 130 comprises a optical branching means 150, the first to fourth optical heterodyne detection systems 151 to 154, the first to fourth electrical-optical converters 161 to 164, and an optical combiner 170.

Figure 4:
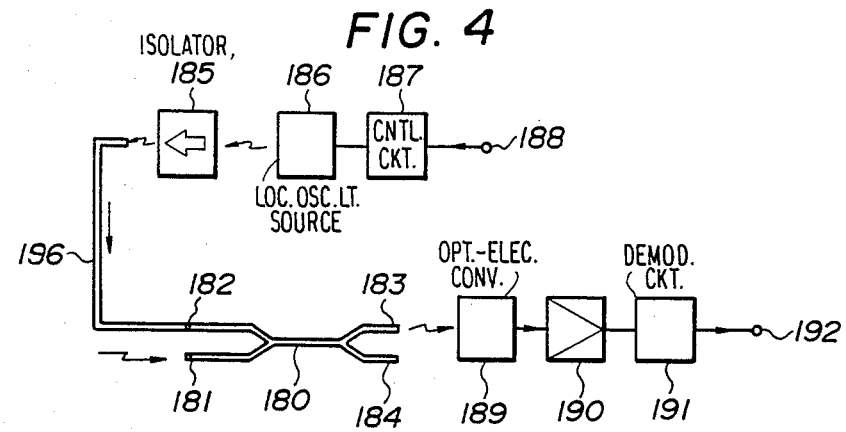
FIG. 4 is a block diagram showing an optical heterodyne detection system to be used in the embodiment according to the invention.

FIG. 4 shows one of the first to fourth optical heterodyne detection systems 151 to 154 which comprises an optical combiner 180 having the first to fourth terminals 181 to 184, an isolator 185 connected through an optical fiber 196 to the second terminal 182 of the optical combiner 180, a local oscillation light source 186 for radiating a local oscillation light, a control circuit 187 for controlling a frequency of the local oscillation light in accordance with a control signal to be applied to a terminal 188 thereof, an optical-electrical converter 189 for converting an output of the third terminal 183 of the optical combiner 180 to an electric signal, an amplifier 190 for amplifying the electric signal of the optical-electrical converter 189, and a demodulating circuit 191 for reproducing a receiving signal to be applied through a terminal 192 thereof to one of the electrical-optical converters 161 to 164.

In the embodiment, although the first to fourth optical heterodyne detection systems 151 to 154 are adopted, these detection systems may be replaced by the first to fourth homodyne detection systems respectively. The features of such optical heterodyne and homodyne detection systems are described on pages 73 to 80 of "Technical Digest of IOOC-ECOC '85", Venezia, Oct. 1–4, 1985 vol. II along with the experimental results recently conducted. One of the features thereof is that a higher selection of wavelength channels is obtained. This advantageous feature makes it possible to use such an optical heterodyne or homodyne detection system as an optical-electrical conversion type of an optical variable wavelength filter. That is to say, an electric signal corresponding to a predetermined signal in a WDM optical signal can be detected in a case where a local oscillation light is swept in regard to its wavelength to be combined with the WDM optical signal. According to the thesis by P. Healey as described on pages 101 to 103 of "Electronics Letters" vol. 21, 1985, crosstalk is completely negligible between channels in a case where the interval of channels is to be set by more than five times the signal band width. This means that the multiple degree of signals becomes bigger by more than one figure as compared to a normal WDM system using an optical filter and multiplexer. Further, a receiving sensitivity is improved by more than 10 dB as compared to a direct detecting system so that power loss is also negligible in an optical branching means even if an optical heterodyne or homodyne detection system is combined to the optical branching means to provide a variable wavelength filter. For these reasons, a bigger scale of an optical wavelength-division switching system is obtained because frequency bands of light are effectively utilized in a case where an optical heterodyne or homodyne detection system is introduced into an optical-electrical conversion type of an optical filter in an optical wavelength-division switching system.

In operation, the first to fourth optical signals which are modulated by the transmitting signals in the channel 1 to 4 are radiated from the first to fourth laser diodes 101 to 104. The transmission rate thereof is 140 Mb/s, and the modulation thereof is of a binary optical frequency shift keying (FSK) in which the amount of the deviation is 280 MHz. On the other hand, control signals are applied through another optical fiber or electric cable (not shown) to the terminal 188 of the control unit 187 in each of the optical heterodyne detection systems 151 to 154. The control signals can be electric signals because it is not necessary to perform the switching in each bit or block of light signals in the optical wavelength-division switching system, although it is necessary to do so in a time-division switching system. Further, the control signals may be transmitted through the optical fiber 110 or 120 along with the optical signals in the form of a WDM optical signal. The first to fourth optical signals, the frequency and wavelength of which are $\nu_1$ to $\nu_4$ and $\nu_1$ to $\nu_4$ respectively, are combined in the optical fixed wavelength multiplexer 105 to from a WDM optical signal which is then propagated through the optical fiber 110. The WDM optical signal is divided into four WDM optical signals in the optical branching means 150 in the optical wavelength-division switching system 130. The four WDM optical signals are supplied to the corresponding optical heterodyne detection systems 151 to 154 respectively. In each of the optical heterodyne detection systems 151 to 154, one of the four outputs of the optical branching means 150 is supplied to the first terminal 181 of the optical combiner 180 to be combined with the local oscillation light which is supplied through the optical fiber 180 to the second terminal 182 thereof. At the third and fourth terminals 183 and 184 of the optical combiner 180, two outputs of the optical signals thus combined are obtained. One of the two outputs of the optical combiner 180 is supplied to the optical-electrical converter 189 to produce an electric intermediate frequency signal which is then amplified in the amplifier 190. The intermediate frequency signal thus amplified is demodulated in the demodulating circuit 191 to produce a receiving signal which is then applied through the terminal 192 to the corresponding one of the first to fourth electrical-optical converters 161 to 164.

The aforementioned local oscillation light is radiated from the local oscillation light source 186 to be passed through the isolator 185 thereby to be supplied to the second terminal 182 of the optical combiner 180. The local oscillation light source 186 is driven to control the frequency of the local oscillation light depending on the control signals applied to the terminal 188 of the control unit 187. The local oscillation light source 186 is of a wavelength tunable DBR semiconductor laser in which an oscillation wavelength thereof can be controlled, and a single wavelength oscillation is obtained.

The outputs of the respective optical heterodyne detection systems 151 to 154 are converted in the corresponding electrical-optical converters 161 to 164 each including a driving circuit and a semiconductor laser so that optical signals modulated in a binary optical FSK, the transmission rate and deviation amount of which are 140 Mb/s and 280 MHz respectively, are produced therein.

In the first to fourth electrical-optical converter 161 to 164, the oscillation frequency thereof is controlled to be fixed values to be described in more detail later.

As a result, the optical signals of the wavelength $\nu_1$ to $\nu_4$ are switched thereamong in accordance with the fixed frequency values in the converters 161 to 164. The optical signals of the wavelengths $\nu_1$ to $\nu_4$ thus switched are combined in the optical combiner 170 to produce a WDM optical signal which is then supplied to the single-mode optical fiber 120. The switching operation will be explained in more detail later.

Although a 4×4 star coupler in which waveguide patterns are formed on $LiNbO_3$ substrate by Ti-diffusion as described on pages 1058 and 1059 of "Electronics Letters" vol. 20, 1984 is used for the optical branching means 150 in the embodiment, such a means as using an optical fiber fused type of 2×2 couplers which are connected by a predetermined number of steps also may be used.

A wavelength tunable DBR laser diode which is used for the local oscillation light source 186 may be the same as a laser diode described on pages 63 to 65 of "Electronics Letters", vol. 21, 1985. Further, such an optical heterodyne detection system as shown in FIG. 4 is described in detail on pages 1022 and 1023 of "Electronics Letters", vol. 20, 1984.

Operation of the optical wavelength-division switching system in the embodiment according to the invention will be explained in more detail in conjunction with FIGS. 5A to 5C.

Figure 5A:
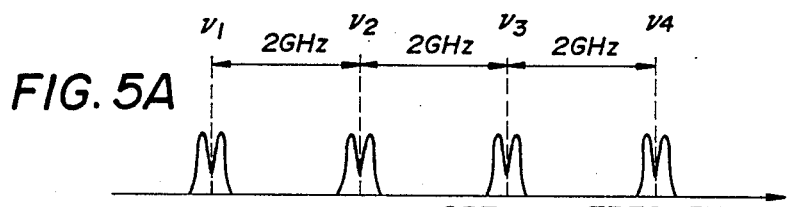
FIGS. 5A to 5C are explanatory diagrams showing optical signal frequency and intermediate frequency in the embodiment according to the invention.

The optical signals are radiated with a frequency interval 2 GHz (a wavelength interval 0.16 Å) to avoid crosstalk therebetween from the laser diodes 101 to 104 in the transmitting station 100 (FIG. 5A). Each of the optical signals has one of the individual oscillation frequencies $\nu_1$, $\nu_2$, $\nu_3$ and $\nu_4$, and the waveform thereof is of a double-humped shape due to FSK (Frequency Shift Keying) modulation in accordance with the corresponding one of transmitting signals in the channels 1 to 4. The optical signals thus FSK modulated are of 140 Mb/s in the transmission rate, and of 280 MHz in the frequency deviation as described before. The frequency and wavelength thereof are, for instance, as follows.

| FREQUENCY ($\times 10^9$ Hz) | | WAVELENGTH $\mu m$ | |
|---|---|---|---|
| $\nu_1$ | 193.54838 | $\lambda_1$ | 1.550000 |
| $\nu_2$ | 193.55038 | $\lambda_2$ | 1.5499839 |
| $\nu_3$ | 193.55238 | $\lambda_3$ | 1.5499679 |
| $\nu_4$ | 193.55438 | $\lambda_4$ | 1.5499520 |

Figure 5B:
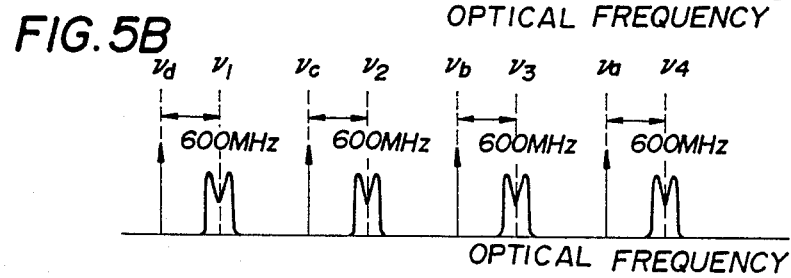
Figure 5C:
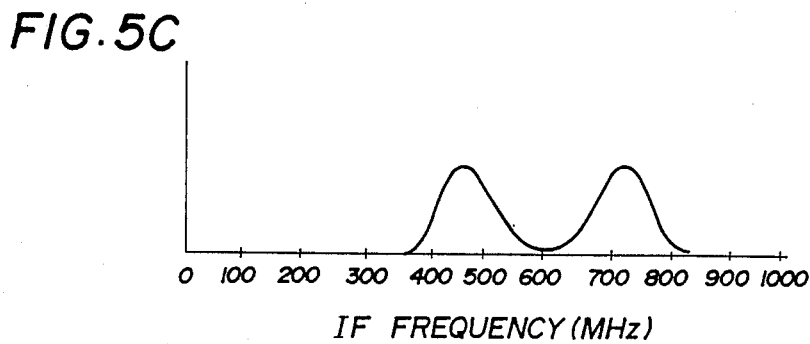

In the optical heterodyne detection systems 151 to 154, the local oscillation lights of predetermined frequencies $\nu_a$, $\nu_b$, $\nu_c$ and $\nu_d$ are radiated from the local oscillation light sources 186 under the control of the control units 187 (FIG. 5B). As a result, the intermediate frequency is produced in each of the optical heterodyne detection systems 151 to 154 so that a double-humped spectrum of FSK signal having a frequency deviation 280 MHz on the left and right sides of the center frequency 600 MHz is obtained (FIG. 5C). One side or both sides of the double-humped spectrum are electrically filtered to be demodulated thereby reproducing a baseband signal. In the optical heterodyne detection system 151, a baseband signal which is carried by the optical signal of the wavelength $\nu_4$ is reproduced. At the same time, baseband signals which are carried by the optical signals of the wavelength and $\nu_3$, $\nu_2$ and $\nu_1$ are reproduced respectively in the optical heterodyne detection systems 152 to 154.

The electrical-optical converters 161 to 164 each of a phase tunable type DFB laser diode, for instance, as described on pages 5 to 7 of "Electronics Letters", vol. 22, 1986 are controlled to produce oscillation frequencies $\nu_1$, $\nu_2$, $\nu_3$ and $\nu_4$ respectively. As a result, the optical signal of the frequency $\nu_4$ is converted to the optical signal of the frequency $\nu_1$, and optical signals of frequencies $\nu_3$, $\nu_2$ and $\nu_1$ are converted to optical signals of frequencies $\nu_2$, $\nu_3$ and $\nu_4$ as follows.

| TO BE SWITCHED (DETECTOR) | | SWITCHED (CONVERTER) | |
|---|---|---|---|
| $\nu_4$ | (151) | $\nu_1$ | (161) |
| $\nu_3$ | (152) | $\nu_2$ | (162) |
| $\nu_2$ | (153) | $\nu_3$ | (163) |
| $\nu_1$ | (154) | $\nu_4$ | (164) |

The switching combination of the invention is not limited to the above example, but may be changed according to the necessity of an optical communication system.

A wavelength tunable light source has been already provided to cover the region of 100 GHz, and even more is possible to cover the region of 700 GHz for the local oscillation light source 186 as described on page 788 of "The transactions of The IECE Japan", vol. E68, 1985. Therefore, a bigger scale of 35 or 70 channels can be selected by using such a local oscillation light source in a case where a frequency interval as defined before is 2 GHz or 10 GHz.

Although a FSK modulation is performed in the optical heterodyne detection system in the embodiment, amplitude-shift-keying (ASK), phase-shift-keying (PSK) etc. may be utilized therein, if the construction thereof is adapted thereto. Especially, an optical wavelength-division switching system according to the invention can be applied even to an optical system which has not been designed to include an optical heterodyne detection system for the reason that an optical heterodyne or homodyne detection system can be applied to an intensity modulation system in which a practically used direct detection is performed, if a light carrier wavelength is stabilized therein. Further, an optical heterodyne detection and direct detection may be combined in such a manner that an optical wavelength-division switching system is used in a trunk line as a tandem switch, while a direct detector is used in a subscriber's line.

Although an optical branching means having no dependence on wavelength is used to introduce optical signals to an optical heterodyne detection system in the embodiment, it may be combined with a variable wavelength filter. Further, although a filtering characteristic of an optical heterodyne detection system is variable based on a variable frequency of a local oscillation light source thereof, the filtering characteristic thereof may be fixed based on a fixed frequency of a local oscillation light source, if a wavelength of an electrical-optical converter is made variable. However, the construction of the embodiment is considered to be superior to the modified construction mentioned above because the connection of a plurality of lines to one line (1:n) is difficult to be performed.

Although the invention has been described with respect to a specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optical wavelength-division switching system with coherent optical detection system, comprising, means for dividing an input wavelength division multiplexed optical signal into a predetermined number of wavelength division multiplexed optical signals, said predetermined number of corresponding to the number of channels of an optical communication system, means for reproducing a predetermined number of electric signals from said predetermined number of wavelength division multiplexed optical signals, said electric signals being separated from each other to correspond to said channels, means for converting said predetermined number of electric signals to a predetermined number of optical signals, said predetermined number of optical signals being controlled to have individual frequencies in accordance with a specified switching condition of said optical communication system, and means for combining said predetermined number of optical signals to provide an optical wavelength division multiplexed optical signal, wherein said means for reproducing is composed of a predetermined number of optical signal detectors, each of said optical signal detectors including a wavelength tunable light source for producing a local oscillation light having an optical frequency controlled in accordance with said specified switching condition, an optical combiner for combining one of said predetermined number of wavelength division multiplexed signals with said local oscillation light to produce an intermediate frequency optical signal, an optical-electrical converter for converting said intermediate frequency optical signal to an intermediate frequency electrical signal, and a demodulator for demodulating said intermediate frequency electric signal to produce one of said predetermined number of electric signals.

2. An optical wavelength-division switching system according to claim 1, wherein said means for converting includes a phase tunable distributed feedback laser diode having a characteristic of light frequency modulation, and a driving circuit for driving said distributed feedback laser diode in accordance with one of said predetermined number of electric signals.

* * * * *

UNITED STATES PATENT AND TRADEMARK OFFICE
CERTIFICATE OF CORRECTION

PATENT NO. : 4,807,227

DATED : February 21, 1989

INVENTOR(S) : Masahiko FUJIWARA et al

It is certified that error appears in the above-identified patent and that said Letters Patent is hereby corrected as shown below:

COLUMN 3, LINE 66  Delete "WOM" and insert therefor --WDM--.

COLUMN 5, LINE 37  Delete "and $v_1$ to $v_4$ respectively" and insert --$\lambda_1$ to $\lambda_4$ respectively--.

COLUMN 6, LINES 17 AND 18  Delete "$v_1$ to $v_4$" and insert --$\lambda_1$ to $\lambda_4$--.

COLUMN 6, LINE 20  Delete "$v_1$ to $v_4$" and insert --$\lambda_1$ to $\lambda_4$--.

UNITED STATES PATENT AND TRADEMARK OFFICE
CERTIFICATE OF CORRECTION

PATENT NO. : 4,807,227

DATED : February 21, 1989

INVENTOR(S) : Masahiko FUJIWARA et al.

It is certified that error appears in the above-identified patent and that said Letters Patent is hereby corrected as shown below:

COLUMN 7, LINE 11  Delete "$v_4$" and insert therefor $--\lambda_4--$.

COLUMN 7, LINE 13  Delete "and $v_3$, $v_2$ and $v_1$" and insert $--\lambda_3, \lambda_2,$ and $\lambda_1--$.

Signed and Sealed this

Fourteenth Day of November, 1989

*Attest:*

JEFFREY M. SAMUELS

*Attesting Officer*   *Acting Commissioner of Patents and Trademarks*